United States Patent [19]
Avellar et al.

[11] B 3,920,973
[45] Nov. 18, 1975

[54] METHOD AND SYSTEM FOR TESTING SIGNAL TRANSMISSION PATHS

[75] Inventors: Karl B. Avellar, Ellicott City; James E. Buchanan, Bowie, both of Md.

[73] Assignee: Westinghouse Electric Corporation, Pittsburgh, Pa.

[22] Filed: Jan. 9, 1973

[21] Appl. No.: 322,239

[44] Published under the Trial Voluntary Protest Program on January 28, 1975 as document no. B 322,239.

[52] U.S. Cl... 235/151.31; 235/151.3; 235/153 AC; 340/146.2
[51] Int. Cl.²........................................ G06F 11/02
[58] Field of Search.......... 235/151, 151.3, 153 AC, 235/184; 340/172.5, 146.2, 146.1 E

[56] References Cited

UNITED STATES PATENTS

| | | | |
|---|---|---|---|
| 3,591,790 | 7/1971 | Couture | 235/184 |
| 3,609,312 | 9/1971 | Higgins | 340/146.2 |
| 3,681,758 | 8/1972 | Oster et al. | 340/172.5 |
| 3,710,350 | 1/1973 | Yoshitake et al. | 340/172.5 |
| 3,746,850 | 7/1973 | Moore et al. | 235/184 |

FOREIGN PATENTS OR APPLICATIONS

| | | | |
|---|---|---|---|
| 1,179,243 | 1/1970 | United Kingdom | 235/153 AC |

*Primary Examiner*—Felix D. Gruber
*Attorney, Agent, or Firm*—J. B. Hinson

[57] ABSTRACT

The disclosure relates to a method and system for testing a plurality of paths over which discrete d.c. signal levels are transmitted between a digital computer and external equipment. A particular configuration of discrete d.c. signal levels is applied to the input or output paths and a signal generated which is related to the sum of the d.c. signal levels on the paths to be tested. A test circuit in a computer input/output unit generates a reference signal and the sum signal may then be evaluated. An unfavorable evaluation may activate a fault indicator.

13 Claims, 5 Drawing Figures

METHOD AND SYSTEM FOR TESTING SIGNAL TRANSMISSION PATHS

BACKGROUND OF THE INVENTION

1. Field of the Invention

The present invention relates to a method and system for testing signal transmission paths and more specifically to a method and system for testing the signal paths over which discrete signal levels are transmitted to and from a digital computer.

2. State of the Prior Art

The need for improved maintenance and fault isolation techniques in systems employing digital computers has increased significantly with the increased use of computers. In fact, a prime factor in the design of a computer controlled system, particularly for military applications, may be its ability to rapidly locate faults through the use of diagnostic routines.

Of course, with the inclusion of a digital computer in a system, those faults internal to the computer itself may be readily diagnosed. However, external system fault detections are reliable only to the extent that the computer itself is fully operable.

Numerous adequate diagnostic programs are available for detecting and isolating faults in the signal processing and memory sections of the computer. These internal computer diagnostic programs may be accomplished with the addition of little or no hardward to the available computer hardware. However, the input/output units associated with computers, particularly the input/output signal paths to the computer, have been particularly troublesome and have often required the addition of expensive and space consuming hardward.

For example, an input/output unit associated with a particular computer may provide analog, digital and discrete input and output signals to the computer from various locations within the system and from the computer to control various system functions. The testing of digital input and output signal paths may be readily accomplished through the transmission of test messages under the control of the program. Moreover, analog input and output signal paths may be tested in accordance with a technique disclosed and claimed in copending U.S. Pat. Application Ser. No. 22,479 filed Mar. 25, 1970, and assigned to the assignee of the present invention. However, discrete output and input signals such as d.c. signal levels which provide information as to the positions of switches, relay contacts, etc., and perform various control functions such as energizing relays are not ordinarily tested due to the expense and size of the additional circuitry required.

OBJECTS AND SUMMARY OF THE INVENTION

It is accordingly an object of the present invention to provide a novel method and system for performing computer input/output unit diagnostic tests.

It is a more specific object of the present invention to provide a novel method and system for testing a plurality of paths over which discrete d.c. signal levels are transmitted between a computer and an input/output unit.

It is another object of the present invention to provide a novel method and system for testing computer system signal transmission paths wherein very little additional hardware is required and wherein the programming and hardware requirements are compatible with existing computer systems.

Briefly, these and other objects and advantages are accomplished by generating a digital test signal representative of the sum of the amplitudes of the discrete d.c. signal levels transmitted over the plurality of paths to be tested and comparing the digital test signal to a corresponding reference signal generated within the computer.

DETAILED DESCRIPTION

Figure 1:
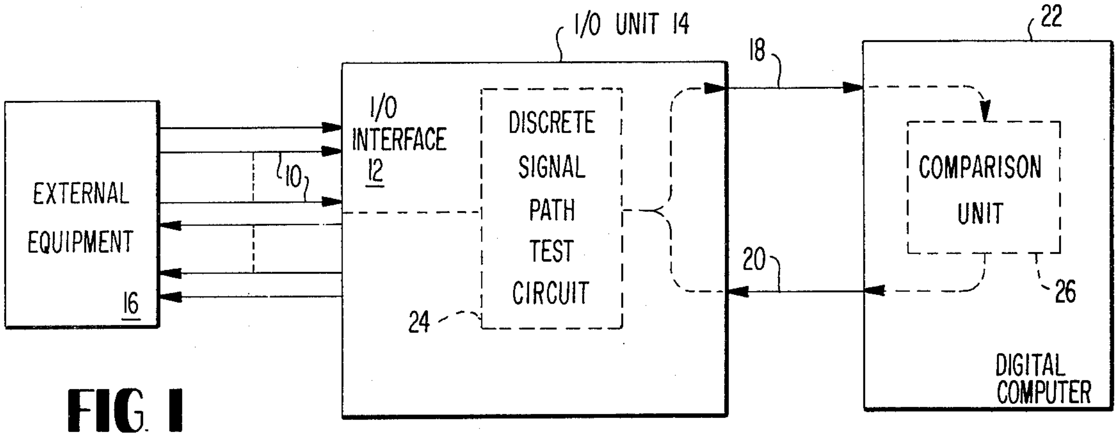
FIG. 1 is a functional block diagram of the transmission path test system of the invention.

Referring to FIG. 1 wherein the overall testing system of the invention is illustrated, a plurality of signal paths 10 communicate between external equipment 16 and an input/output interface circuit 12 of an input/output unit 14. A plurality of signal paths collectively illustrated as a computer input bus 18 and a computer output bus 20 communicate between the input/output interface circuit 12 of the input/output unit 14 and a computer 22 by way of a discrete signal path test circuit 24.

The signal paths 10 may carry analog, digital and discrete input and output signals between the input/output unit 14 and the external equipment 16. The input/output interface 12 typically performs translation and/or multiplexing functions, converting signals from the external equipment 16 into signals compatible with the digital computer 22 and converting signals from the digital computer 22 into signals compatible with the external equipment 16. The computer compatible signals are typically transmitted to and from the computer over the signal paths connecting the computer 22 to the input/output unit 14, i.e., the input and output buses 18 and 20.

The input/output unit 14 also includes discrete signal path test circuits indicated in phantom at 24 for testing the discrete signal transmission paths in conjunction with a comparison unit 26 in the computer 22 as is hereinafter described. The discrete input signals from the external equipment 16, the discrete output signals from the computer 22 and the output signal from the comparison unit 26 may be applied via the input/output interface 12 to the discrete signal path test circuit 24 and the signals generated by the discrete signal path test circuit 24 applied to the digital computer 22 by way of the computer input bus 18.

In operation, the signals generated by the external equipment 16 are routed through the input/output unit 14 to the digital computer 22. These discrete input signals are also applied to the test circuit 24 and the output signal from the test circuit 24 is also applied to the computer 22. Likewise, the discrete output signals generated by the computer 22 are applied to the external equipment via the input/output unit 14 and are applied to the test circuit 24.

When the diagnostic program is initiated by the computer 22, the test circuit output signal is evaluated under the control of the computer with respect to either the discrete input or output signals. If the evaluation indicates that the test circuit 24 output signal is not correct for the particular configuration or combination of discrete signal levels being transmitted over the paths being tested, the comparison unit may provide a fault indication as is hereinafter described in greater detail. The discrete signal levels may thereafter be altered manually or under the control of the computer to isolate the transmission path fault.

Figure 2:
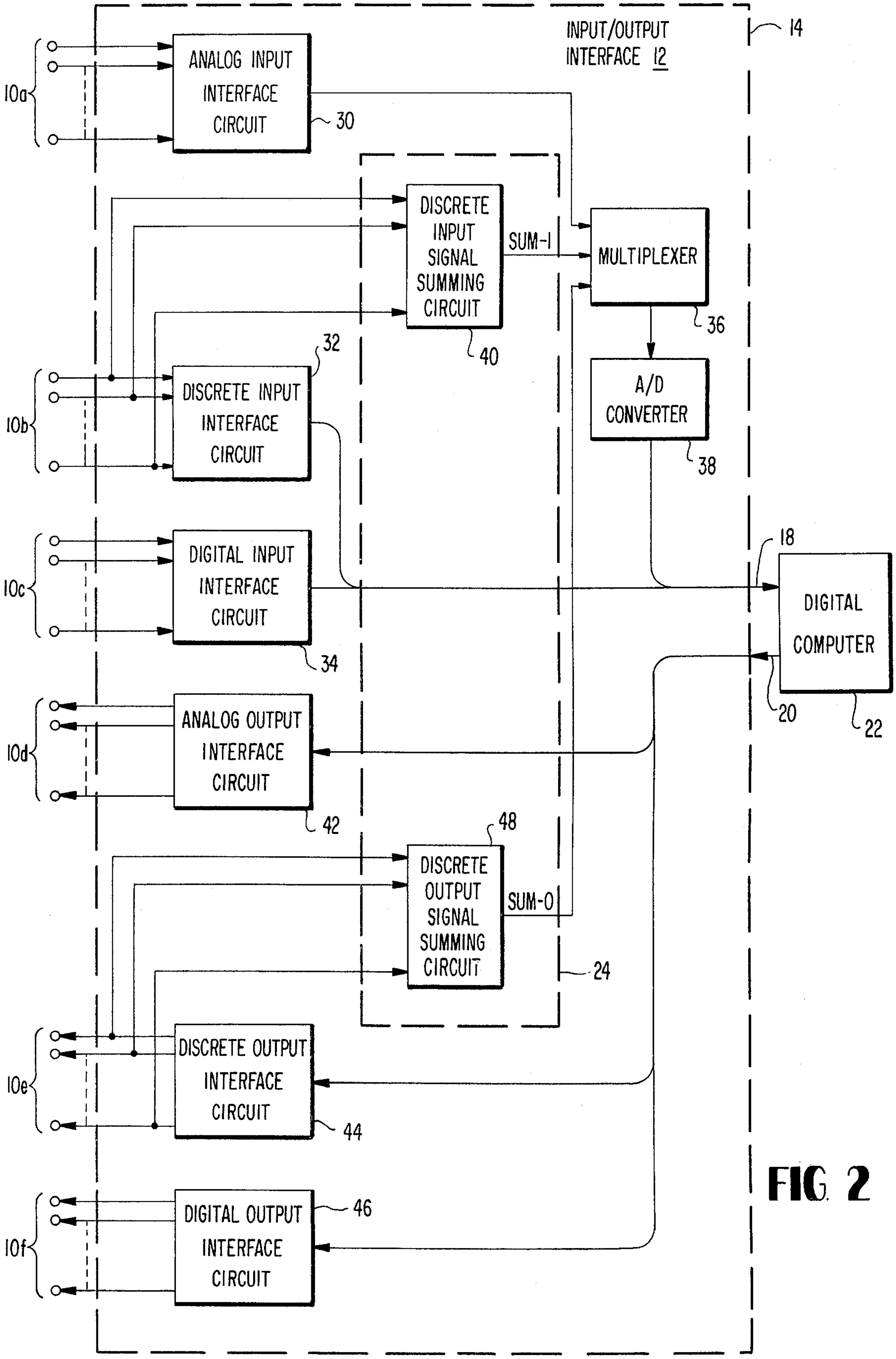
FIG. 2 is a functional block diagram of the input/output unit of FIG. 1.

The input/output unit 14 is illustrated in greater detail in FIG. 2. Referring now to FIG. 2, the plurality of signal transmission paths 10 are illustrated in groups according to the type of signal transmitted thereover.

The groups of input paths 10*a*, 10*b* and 10*c* may include those paths over which the respective analog, discrete and digital signals are transmitted from the external equipment to the input/output unit 14.

The groups of input signal paths 10*a*, 10*b* and 10*c* may be connected to respective input interface circuits 30, 32 and 34 for interfacing with the computer input bus line 18. The analog input signals may be multiplexed with other analog signals by a conventional multiplexer 36 and converted into digital signals by a suitable conventional analog to digital (A/D) converter 38 prior to transmision to the computer 22 via the computer input bus 18.

The discrete input signals transmitted to the input/output unit 14 along the group of paths 10*b* may also be applied to a discrete input signal summing circuit 40 of the discrete signal path test circuit 24. The output signal SUM-I from the discrete input signal summing circuit 40 may be applied to the computer input bus 18 via the multiplexer 36 and the A/D converter 38.

The various analog, discrete and digital output signals from the computer 22 may be applied via the computer output bus 20 to respective output interface circuits 42, 44 and 46 of the input/output unit 14 for application to the external equipment 16 of FIG. 1 via the respective groups of signal paths 10*d*, 10*e* and 10*f*. The discrete output signals transmitted to the external equipment 16 over the group of signal paths 10*e* may also be applied to a discrete output signal summing circuit 48 in the discrete signal path test circuit 24 and the output signal SUM-O from the summing circuit 48 may be applied through the multiplexer 36 and the A/D converter 38 to the computer input bus 18 for transmission to the computer 22.

In operation, the interface circuits 30, 32, 34, 42, 44 and 46 may operate in any suitable conventional manner to interface the external equipment 16 with the computer 22. For example, the input bus 18 may typically be a 10 to 18 line parallel bus and each group of input signal paths 10*a*, 10*b* and 10*c* may include 30 or 40 input lines. Each of the input interface circuits 30, 32 and 34 may serve to multiplex the input signals onto the bus 18 in a conventional manner. Moreover, in the event that the input signals are incompatible with subsequent input/output unit or computer logic circuitry, the input interface circuits may include suitable level converters to transform the input signals into signals compatible with the aforementioned circuitry. The output interface circuits 42, 44 and 46 may operate in a like manner to convert the output signals from the digital computer 22 into signals compatible with the external equipment 16 and/or to demultiplex the output signals from the computer 22.

With continued reference to FIG. 2, the multiplexer 36 may be utilized to multiplex all analog signals thereby permitting the use of a single A/D converter 38. The multiplexer 36 may, for example, be controlled by the digital computer 22 so that the various input signals to the multiplexer 36 may be applied to the computer 22 as required.

When the computer 22 is placed in diagnostic mode either by the operator or automatically through the computer program, the computer 22 may "call up" the sum of the discrete input signals from the summing circuit 40. This analog signal SUM-I may then be converted to a digital signal by the A/D converter 38 and applied to the computer 22 together with the discrete input signals from the interface circuit 32. The sum signal SUM-I may then be utilized by the computer 22 to evaluate the transmission paths over which the discrete input signals are transmitted between the external equipment 16 and the computer 22.

Figure 3:
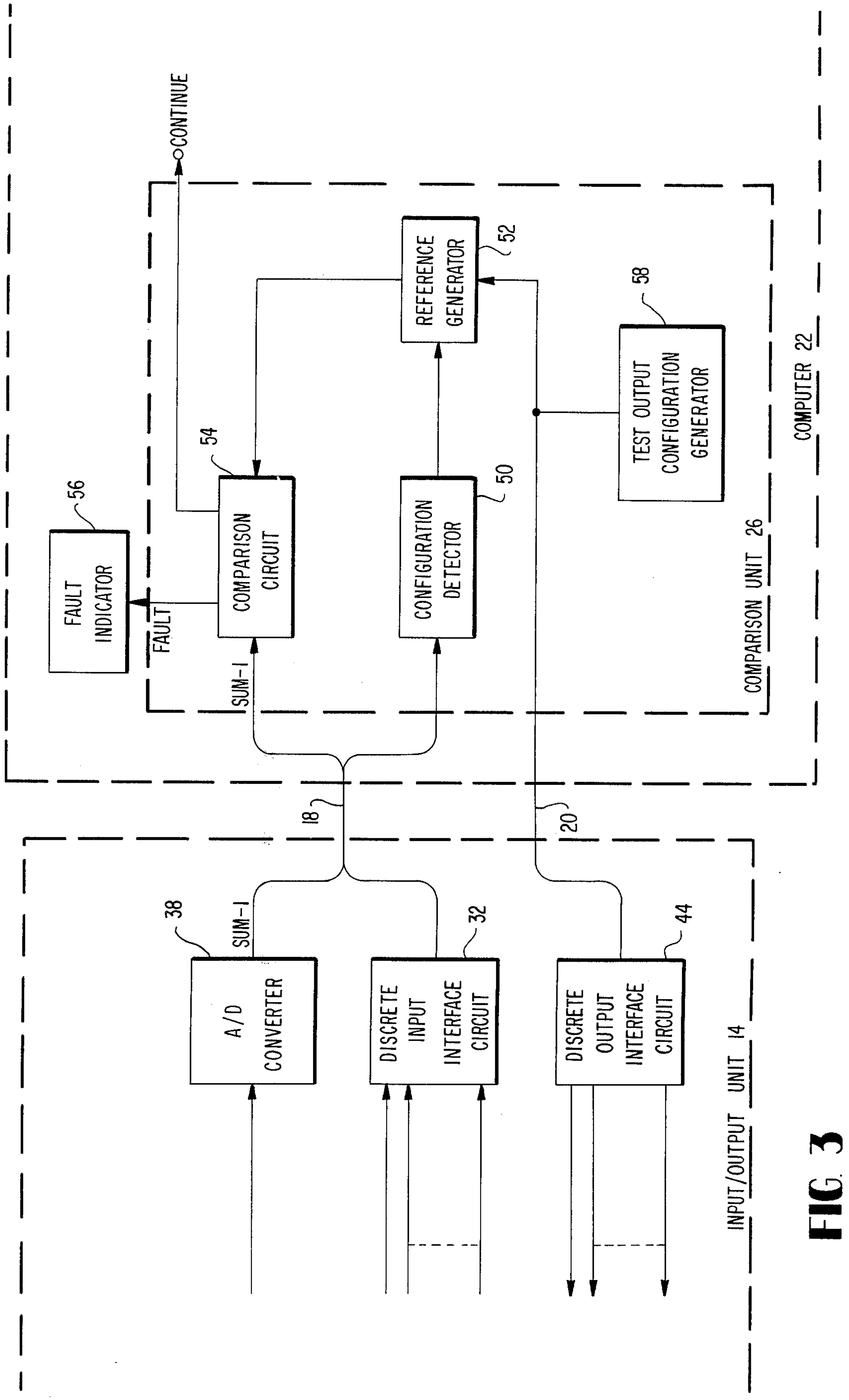
FIG. 3 is a functional block diagram of the comparison unit of the computer of FIG. 1.

For example, the discrete input signals applied to the computer 22 may include several signals with high signal levels and several signals with low or ground signal levels transmitted over particular signal paths. As is illustrated in FIG. 3, the computer 22 may detect the configuration of the discrete signal levels, i.e., the identity of the paths on which signals of a particular level appear through the use of a suitable logic circuit such as the configuration detector generally indicated at 50. The computer 22 may then either generate or retrieve from memory a digital reference signal indicative of the sum of the discrete input signals for a faultless transmission in that particular configuration. This digital reference signal may be applied from a reference signal generator 52, illustrated in FIG. 3, to a comparison circuit 54 for comparison with the digital sum signal SUM-I from from the A/D coverter 38 of FIG. 2. An output signal CONTINUE from the comparison circuit 54 indicating a favorable comparison may be utilized to continue the diagnostic routine, whereas an output signal FAULT indicating an unfavorable comparison may be utilized to indicate a transmission fault through the use of a suitable conventional indicator 56.

As shown in FIG. 3, a test output configuration generator 58 may be utilized to test the discrete signal output paths and to transmit predetermined configurations of discrete output signals to the discrete output interface circuit 44. These discrete output signals may then be combined by the summing circuit 48 of FIG. 2 to provide the analog signal SUM-O. The signal SUM-O may be applied, via multiplexer 36 and A/D converter 38, to the comparison circuit 54 of FIG. 3. An output signal from the test output configuration generator 58 indicating which output signal configuration is being transmitted over the signal paths may also be applied to the reference generator 52. The reference generator 52 may then generate or retrieve a digital reference signal and apply this digital reference signal to the comparison circuit 54 for comparison with the digital SUM-O signal from the summing circuit 48 of FIG. 2. The output signals from the comparison circuit 54 may be utilized in the same manner as aforementioned in the description of the testing of input paths.

Figure 4:
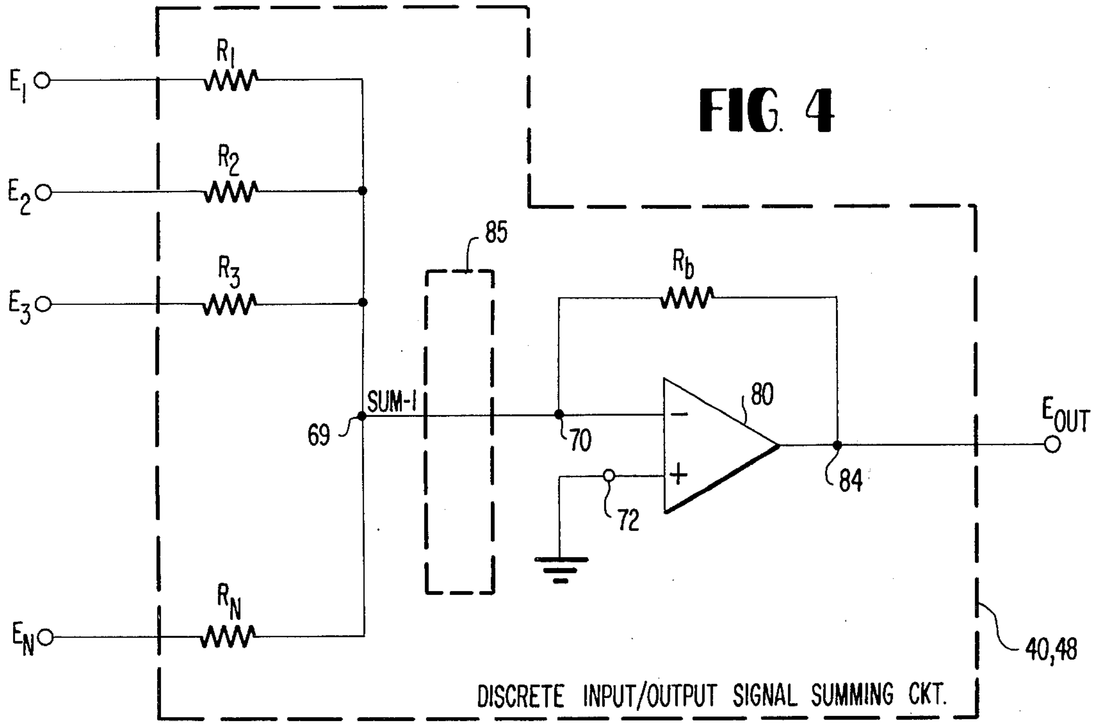
FIG. 4 is a schematic circuit diagram of one embodiment of the discrete signal test circuit of FIG. 2; and, FIG. 5 is a schematic circuit diagram of the optional calibration circuit of the discrete signal test circuit of FIG. 2.

In order to facilitate an understanding of the invention, a more detailed schematic of one embodiment of the discrete signal summing circuits 40 and 48 of FIG. 2 is shown in FIG. 4. Referring now to FIG. 4, each discrete d.c. signal level to be summed, $E_1$, $E_2$, $E_3$ . . . $E_n$, is applied through a corresponding input summing resistor, $R_1$, $R_2$, $R_3$ . . . $R_n$, to a summing junction 69 and from there to the negative input terminal 70 of an operational amplifier 80 having its positive input terminal 72 grounded. A feedback resistor Rf connects the output terminal 84 of the operational amplifier 80 to the negative input terminal 70 thereby providing a negative feedback path. The differential voltage between the positive and negative input terminals 72 and 70, respectively, of the operational amplifier 80 thus approaches zero volts, i.e., virtual ground. Noting that the negative feedback creates this virtual ground at the negative input terminal 70 and that the high gain of the operational amplifier 80 reduces the current in the amplifier 80 to a negligible value, it can be seen from Kirchhoff's current laws that the output voltage Eout at the output terminal 84 is equal in value to the product of the feedback resistor $Rf$ and the sum of the currents through the input summing resistors, i.e., $Eout = -Rf [E_1/R_1 + E_2/ R_2 + \ldots E_n/ R_n]$.

When a large number of discrete signal paths are simultaneously tested utilizing a summing circuit such as that illustrated in FIG. 4 to generate a test signal, an erroneous indication may result due to variation in power supply voltages. Any voltage variation manifested as deviations from the prescribed d.c. signal levels (uncertainty factors) are additive and, in addition, the total deviation is amplified by the summing amplifier 80. The uncertainty factors in the discrete d.c signal levels may limit the number of summing inputs that can be tested by the system since a large total variation may result in an unwarranted unfavorable comparison between the test and reference signals. For this reason an optional compensation circuit 85 may be inserted as shown between the summing junction 69 and the input terminal 70 of the amplifier 80.

Figure 5:
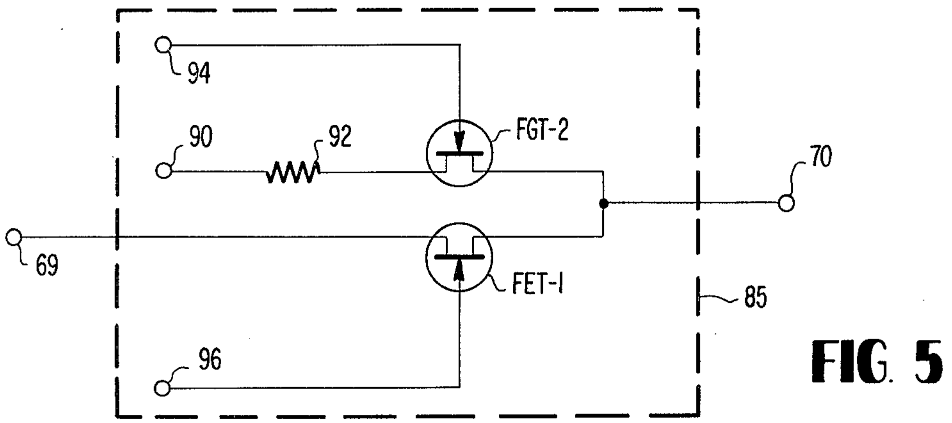

With reference to FIG. 5 wherein one embodiment of the compensation circuit of FIG. 4 is illustrated, the summing junction 69 for the input d.c. signals $E_1$, $E_2$ . . . $E_n$ is connected to the input terminal 70 of the amplifier 80 through a field effect transistor FET-1. A calibration signal input terminal 90 is also connected to the input terminal 70 of the amplifier 80 by way of a reference resistor 92 and a second field effect transistor FET-2. The conduction of the two transistors FET-1 and FET-2 may be conventionally controlled by the computer by the application of control signals to the terminals 94 and 96.

In operation in the calibration mode, a reference or typical discrete d.c. signal level input or output signal may be applied through the reference resistor 102 with the transistor FET-2 conducting and the transistor FET-1 in cutoff. The resultant output voltage of the operational amplifier 80 may be compared to an expected value and the deviation utilized to compute a correction factor. For example, a reference value applied to the calibration input terminal 90 may result in an output signal from the amplifier 80 which is three-fourths of an expected calibration voltage $V_E$. The total number $N$ of the high signal level discrete d.c. signals in the configuration being transmitted over the signal paths may be determined by the computer and a correction factor $C$ determined as follows:

$$C = \frac{1}{4}(V_E)(N)$$

The correction factor $C$ may then be either added to the incoming sum signal transmitted to the computer from the amplifier 80 with the transistor FET-1 conducting and the transistor FET-2 in cutoff. Alternatively, with both of the transistors FET-1 and FET-2 conducting, the appropriate correction factor voltage may be applied to the input terminal 70 of the amplifier 80 through the reference resistor 92 at the same time that the signal SUM-I to be tested is applied thereto to thereby compensate for any variation of the discrete d.c. signal levels from their proper values. The possibility of a false indication of a fault in the transmission paths may thus be minimized.

It should be noted that the test circuitry of the comparison unit 26 in the computer 22 need not be a hard wired, computer controlled circuit as illustrated in FIG. 3. The detection of the input configurations, the generation of the output configurations, the obtaining of a reference signal and the comparison process may all be implemented according to the foregoing description by one skilled in the art through the use of a diagnostic routine utilizing available memory space in the computer 22. The various functions of the comparison unit 26 may also be accomplished through the use of a combination of hard wired circuitry and a diagnostic routine as desired.

It is apparent from the foregoing description that the invention provides a particularly advantageous transmission path testing system. For example, the addition of expensive and space consuming hardware is not required. Moreover, the required additional circuitry is generally simple and thus inexpensive, particularly since no critical components are required. For example, in the embodiments described, low cost integrated circuit amplifiers and low precision summing resistors (1 percent) can be used. Aslo, the use of integrated circuit amplifiers and thin or thick film resistor networks permit the use of a large number of test circuits with little consumption of space.

In addition, the testing system and method of the present invention is compatible with most existing computer systems and can be readily periodically effected under the control of the computer without the need for special controls or excessive computer down time. All switching and multiplexing can be controlled by the digital computer. Moreover, the subject test system alleviates a problem inherent in most digital checking schemes, in that failures in the test system do not affect the operational discrete signals.

The present invention may be embodied in other specific forms without departing from the spirit or essential characteristics thereof. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for testing a plurality of paths over which discrete d.c. signal levels are transmitted between a digital computer and external equipment comprising:

external means for transmitting a configuration of said discrete d.c. signal levels over said plurality of paths;

a computer input/output unit remote from said transmitting means and including means for generating a sum signal related to the sum of the discrete d.c. signal levels transmitter over said plurality of paths;

a digital computer including means for causing the evaluation of said sum signal with respect to the transmitted configuration of discrete d.c. signal levels and for manifesting the results of the evaluation.

2. The system of claim 1 wherein sum signal generating means comprises a summing amplifier for generating an analog sum signal related in levels to the sum of the amplitudes of the discrete signal levels.

3. The system of claim 2 wherein said summing amplifier includes means for modifying the sum signal by a predetermined amount to compensate for undesired variations in the levels of said discrete signal levels.

4. The system of claim 1 wherein said evaluation causing means performs the functions of:

detecting the configuration of discrete d.c. signal levels transmitted over said paths; and, comparing said sum signal to a reference signal selected in response to the detected configuration.

5. The system of claim 3 wherein said evaluation causing means performs the functions of:

detecting the configuration of discrete d.c signal levels transmitted over said paths; and, comparing said sum signal to a reference signal selected in response to the detected configuration.

6. A system for testing a plurality of paths for transmission of discrete d.c. signal levels comprising:

means for transmitting a configuration of discrete d.c. signal levels over said plurality of paths;

means responsive to and remote from said transmitting means for generating a digital signal representative of the sum of the amplitudes of the discrete signal levels transmitted over said plurality of paths;

means for storing a plurality of digital signals each representative of the sum of the discrete signal levels for a predetermined configuration of discrete signal levels transmitted over said paths;

means for ascertaining the configuration of discrete signal levels being transmitted over said plurality of signal paths;

means for selecting one of said plurality of stored digital signals in response to the ascertained configuration;

means for comparing said generated digital signal with said selected one of said stored signals; and, means operatively connected to said comparing means for indicating a fault in one of said paths in response to an unfavorable comparison of said digital signals.

7. The system of claim 6 wherein said digital signal generating means comprises:

a summing amplifier for generating an analog signal related in amplitude to the sum of the amplitudes of the discrete signal levels; and, an analog to digital converter for converting said analog signal into said digital signal.

8. The system of claim 7 wherein said summing amplifier includes means for modifying the sum signal by a predetermined amount to compensate for variations in the amplitude of said discrete signal levels.

9. A method for testing an apparatus which includes a plurality of paths over which discrete d.c. signal levels are transmitted between a computer and external equipment through a computer input/output unit wherein the plurality of paths are tested by the apparatus automatically performing the steps of:

a. transmitting a configuration of said discrete d.c. signal levels over said plurality of paths from a location remote from the input/output unit;

b. generating, at the input/output unit, a sum signal related to the sum of the discrete d.c. signal levels transmitted over said plurality of paths;

c. evaluating, at the digital computer, the sum signal with respect to the transmitted configuration of discrete d.c. signal levels; and, d. manifesting the results of the evaluation.

10. The method of claim 9 wherein the sum signal is a digital signal and is generated by summing the amplitudes of the discrete signal levels to provide an analog sum signal and converting the analog sum signal into a digital sum signal.

11. The method of claim 10 including the step of modifying the sum signal by a predetermined amount to compensate for undesired variations in the amplitudes of said discrete signal levels.

12. The method of claim 11 wherein the evaluation of the sum signal is accomplished by the digital computer and includes the steps of:

i. detecting the configuration of discrete d.c. signal levels transmitted over said paths; and, ii. comparing the sum signal to a reference signal selected in response to the detected configuration.

13. The method of claim 9 wherein the evaluation of the sum signal is accomplished by the digital computer and includes the steps of:

i. detecting the configuration of discrete d.c. signal levels transmitted over said paths; and, ii. comparing the sum signal to a reference signal selected in response to the detected configuration.

* * * * *